S. WOODS.
PROCESS OF UNITING TOGETHER WIRES, STRIPS, OR PIECES OF METAL.
APPLICATION FILED JAN. 21, 1910.
965,788.
Patented July 26, 1910.
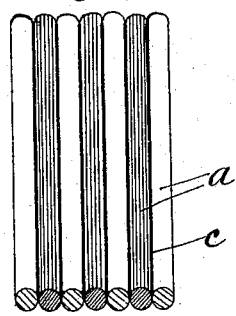
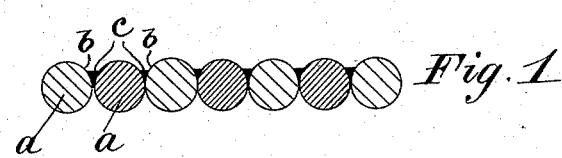
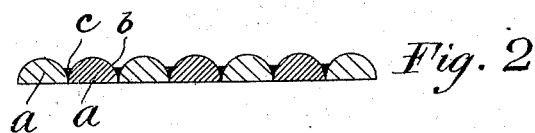
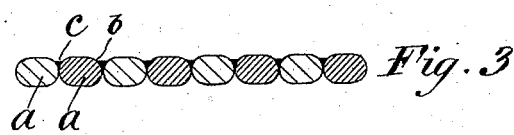
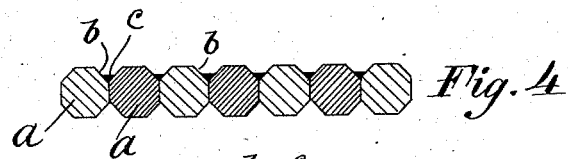
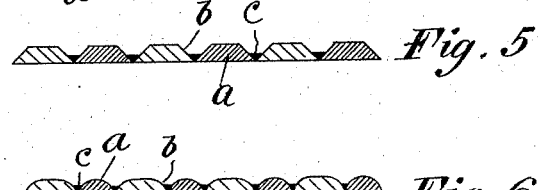
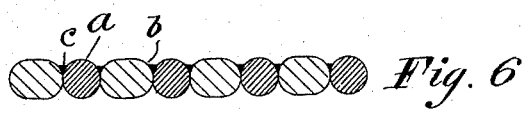
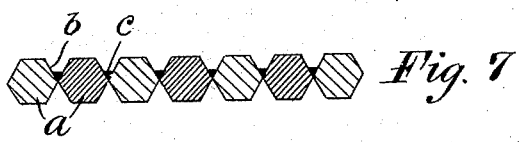

S. WOODS.
PROCESS OF UNITING TOGETHER WIRES, STRIPS, OR PIECES OF METAL.
APPLICATION FILED JAN. 21, 1910.

965,788.

Patented July 26, 1910.

2 SHEETS—SHEET 2.

Witnesses:
E. P. La Gay
John Herr

Stephen Woods  Inventor
By his Attorneys
Burney Mastick & Ogden

UNITED STATES PATENT OFFICE.

STEPHEN WOODS, OF NEW ROCHELLE, NEW YORK.

PROCESS OF UNITING TOGETHER WIRES, STRIPS, OR PIECES OF METAL.

965,788. Specification of Letters Patent. Patented July 26, 1910.

Application filed January 21, 1910. Serial No. 539,408.

*To all whom it may concern:*

Be it known that I, STEPHEN WOODS, a citizen of the United States, and a resident of New Rochelle, Westchester county, New York, have invented a certain new and useful Process of Uniting Together Wires, Strips, or Pieces of Metal, of which the following is a specification accompanied by drawings.

My invention relates to a process of uniting together wires, strips or pieces of metal to form an integral structure. The wires, strips or pieces of metal to be so united together are preferably of contrasting colors or characteristics, such as silver and gold, platinum and gold, silver and copper, silverplate and goldplate, gold of different colors, and the like. The process finds particular application in connection with the manufacture of articles of jewelry, such as cigar and cigarette-cases, matchboxes, watchcases, cuff-buttons, brooches, and the like, wherein the wires, strips or pieces of metal to be united are very small and on account of their size difficult to handle. It has not been practical heretofore to unite such small wires, strips or pieces together into an integral structure satisfactorily and in a workmanlike manner, the expensive process of inlaying being resorted to to produce the effect to the eye which is more easily and cheaply produced by my process.

In the following I have described, in connection with the accompanying drawings, one means of carrying out my invention, referring also to certain modifications, the particular features of the invention being more fully pointed out hereinafter in the claims.

Figure 11:
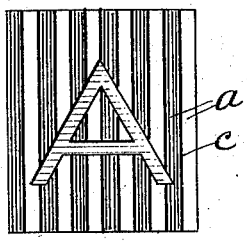
Figure 13:
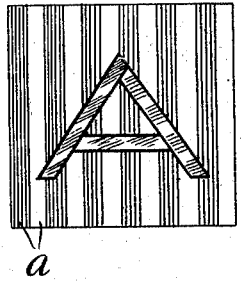
Figure 12:
Figure 14:
Figure 15:
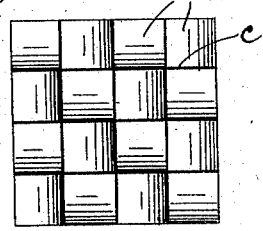
Figure 16:
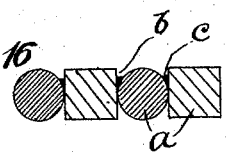

In the drawings, Figures 1 to 7 inclusive, are sectional views on an enlarged scale, showing the shape of various types and kinds of strips of metal or wire adapted to be used in my process. Fig. 8 is a perspective view of a number of such strips placed side by side before being subjected to pressure. Fig. 9 is a perspective view of the integral structure resulting from rolling or pressing the structure shown in Fig. 8. Fig. 10 is a sectional view of the structure shown in Fig. 9, showing the shape of the strips after they have been subjected to pressure. Fig. 11 is a plan view, showing a series of strips side by side similar to Fig. 8 but with an initial letter inserted in said strips and soldered in position. Fig. 12 is a cross-section of the structure shown in Fig. 11. Fig. 13 is a plan view of the structure shown in Fig. 11 after the rolling or pressing operation. Fig. 14 is a cross-sectional view of the structure shown in Fig. 13. Fig. 15 is a plan view of a modification. Fig. 16 is a cross-section of the modification shown in Fig. 15 and Figs. 17, 18, and 19 are plan views of modifications.

In the several views similar letters of reference indicate similar parts.

$a$, $a$, $a$ indicate strips or wires of metal which may be of any convenient shape and size provided that when placed side by side channels or ducts $b$, $b$, $b$ are formed between them, the arrangement being preferably such that when solder $c$ is placed in channel $b$ and melted it runs continuously and evenly along said channel from end to end of the adjacent strips uniting the strips solidly and evenly together, but preferably does not pass down between the strips substantially below the bottom of said channel. The stream of solder is very shallow and fine so that preferably when the strips are subjected to pressure no solder shows between the flattened strips.

In the practice of the process it will be found that no material proportion of the solder passes down between the strips when they are held tightly together side by side, because the lower part of the strips or wires beneath the channels is cooler than the upper and the solder is chilled and caused to set before it has time to pass down between the strips. The stream of molten solder should be continuous because, if interrupted, a crack or flaw will be found in the structure at the point where the solder was interrupted. In Figs. 1 to 7 I have shown the strips or wires of various cross-sections, such shapes being merely illustrative of the shapes which may be advantageously used in connection with the practice of my process, although I prefer to use wires of such shape that when placed side by side they have but a single point or straight line of contact such as round or oval wire, as shown in Figs. 1, 3 and 6. In each case it will be noted, however, that the strips are of such shape and so arranged with reference to each other, that a suitable duct or channel for the solder is formed between the adjacent strips. After the strips $a$, $a$, $a$ have been placed side by side and held closely in that position by any suitable means, the solder c as has been explained is placed in the channels b and melted and permitted to cool. The structure thus prepared will be as shown, for example, in Fig. 8, where the strips are shown as round in cross-section as in Fig. 1. The thus united strips are then rolled or otherwise suitably pressed so as to flatten the structure as thin as may be desired and in accordance with the pressure exerted thereon. The resulting structure, as illustrated in Figs. 9 and 10, will be found to be comprised of parallel strips of dissimilarly colored metals having the appearance of inlay as the solder is in such small quantity that it does not show between the strips after pressure, the strips appearing to the eye to be in close and exact contact with each other. Any suitable kind of solder can be used but I prefer to use a solder of one of the metals to be united that is, for example, either gold, silver or platinum, the solder being of any desired degree of purity.

In Fig. 11, I have shown a structure similar to that shown in Fig. 8, wherein I have cut out an initial letter, in this case an "A," after the strips have been soldered together, but before they have been rolled or pressed, and inserted in the cut-out portion a strip or wire of the metal desired to form the initial letter. This is also soldered in and the structure is then submitted to rolling or pressure and results in an integral structure having the initial letter firmly embedded therein and being flat in cross-section as shown in Fig. 14.

In Fig. 15, I have shown in plan view an arrangement of pieces of metal to form a checkerboard square. The cross-section of the pieces may be any of the forms shown for purpose of illustration in Figs. 1 to 7.

In Figs. 15 and 16, I have shown the pieces of metal to be used as round in cross-section. If the checkerboard structure is to be in squares, the pieces should be of a length equal to the diameter so that when flattened out they will form squares. In this case the alternate pieces of metal are arranged so that the end of one piece abuts the side of the adjacent piece as is clearly shown by the drawings. The solder c is then placed in the ducts or channels b as before, melted and cooled and the structure subjected to rolling or pressure.

Figure 19:
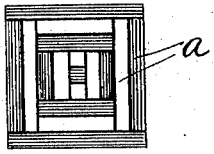
Figure 17:
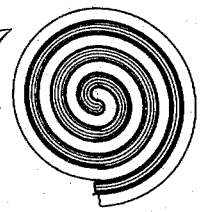
Figure 18:
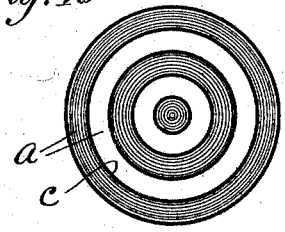

In Fig. 17, I have shown the strips or pieces arranged spirally and in Fig. 18 they are shown concentrically arranged. In Fig. 19, they are shown in the form of included squares. Of course the strips or pieces may be arranged in many different ways with respect to each other. As further illustration I cite the various convolute forms such as the revolute, involute, imbricated or equitant. Such forms could also be inserted as shown in the case of an initial in Figs. 11 and 13.

It is obvious that the structures may be of many sizes and shapes and of any suitable metals and that after being rolled out in the flat or while being submitted to pressure they may be shaped or formed by suitable dies or otherwise as desired, so that from the plate may be struck up suitable shells for any desired use.

I do not limit myself except as the scope of the claims demands to the practice of the process in connection with any particular metal or metals, nor for any particular articles, nor for any particular form of strip or piece whether in plan or section.

What I claim and desire to secure by Letters Patent of the United States is:

1. A process of uniting together metallic strips of such character that, when placed adjacent to each other there is a duct or channel between the respective strips, consisting in placing solder in such ducts or channels, melting the solder and after cooling, submitting the united strips to pressure.

2. A process of uniting together metallic strips of such character that, when placed adjacent to each other a duct or groove is formed between the respective strips, consisting in arranging the strips in parallel relation to each other, placing solder in the ducts or grooves between the strips, melting the same and after cooling, submitting the united strips to pressure.

3. A process of uniting together metallic strips of such character that, when placed adjacent to each other there is a duct or channel between the respective strips, consisting in placing solder in such duct or channel, melting the solder, cooling the same, cutting out a design in said united strips, soldering a filling piece in said cutout portion and submitting the structure to pressure.

4. A process of uniting together metallic strips of such character that, when placed adjacent to each other there is a duct or channel between the respective strips, consisting in arranging the strips in the form of alternate strips of dissimilarly colored metallic wires, soldering said strips together, and after cooling, submitting said soldered strips to pressure.

In testimony whereof I have signed this specification in the presence of two subscribing witnesses.

STEPHEN WOODS.

Witnesses:
K. G. LEARD,
CHARLES McCORMACK.